(12) United States Patent
Oki

(10) Patent No.: US 7,354,109 B2
(45) Date of Patent: Apr. 8, 2008

(54) RECLINER ADJUSTER HAVING MAIN AND AUXILIARY LOCK GEARS

(75) Inventor: Yasukazu Oki, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 257 days.

(21) Appl. No.: 11/207,882

(22) Filed: Aug. 22, 2005

(65) Prior Publication Data

US 2007/0040435 A1 Feb. 22, 2007

(51) Int. Cl.
*B20N 2/02* (2006.01)
*B20N 2/48* (2006.01)

(52) U.S. Cl. .................................................. 297/367

(58) Field of Classification Search ................ 297/366, 297/361.1, 367, 362
See application file for complete search history.

(56) References Cited

U.S. PATENT DOCUMENTS

| | | | |
|---|---|---|---|
| 6,325,458 B1* | 12/2001 | Rohee et al. | 297/367 |
| 6,676,217 B2* | 1/2004 | Lange | 297/367 |
| 7,021,715 B2* | 4/2006 | Umezaki | 297/367 |
| 2002/0043855 A1 | 4/2002 | Lange | |
| 2003/0085603 A1* | 5/2003 | Lee et al. | 297/367 |
| 2003/0230923 A1* | 12/2003 | Uramichi | 297/367 |

FOREIGN PATENT DOCUMENTS

| | | |
|---|---|---|
| FR | 2 801 850 | 6/2001 |
| JP | 2000-245561 | 9/2000 |
| JP | 2000-342370 | 12/2000 |

* cited by examiner

*Primary Examiner*—David Dunn
*Assistant Examiner*—Kaitlin A Wilson
(74) *Attorney, Agent, or Firm*—Wenderoth, Lind & Ponack, L.L.P.

(57) ABSTRACT

A recliner adjuster for adjusting an inclination of a seat back with respect to a seat cushion includes a guide bracket to be secured to one of the seat cushion and the seat back, an internal gear to be secured to the other of the seat cushion and the seat back, a cam rotatably mounted between the guide bracket and the internal gear, a pair of lock gears interposed between the guide bracket and the internal gear so as to be radially slidable in association with rotation of the cam, and a pair of auxiliary lock gears interposed between the guide bracket and the internal gear so as to be radially slidable in association with the pair of lock gears. The rotation of the cam causes the pair of lock gears to radially slide between respective engaging positions, at which engaging teeth thereof are held in engagement with internal teeth of the internal gear, and respective engagement released positions at which the engagement of the engaging teeth of the pair of lock gears with the internal teeth of the internal gear is released. A radial sliding movement of the pair of lock gears between the engaging positions and the engagement released positions causes the pair of auxiliary lock gears to radially slide between respective engaging positions, at which the engaging teeth thereof are held in engagement with the internal teeth of the internal gear, and respective engagement released positions at which the engagement of the engaging teeth of the pair of auxiliary lock gears with the internal teeth of the internal gear is released.

4 Claims, 5 Drawing Sheets

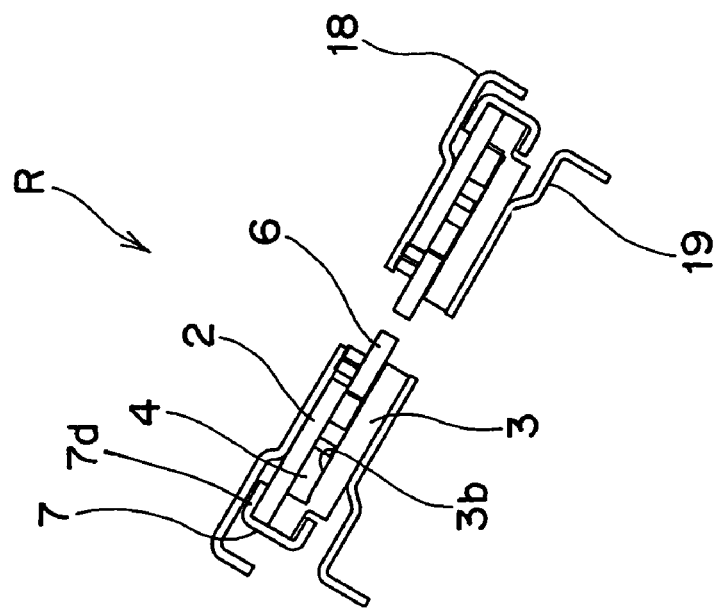
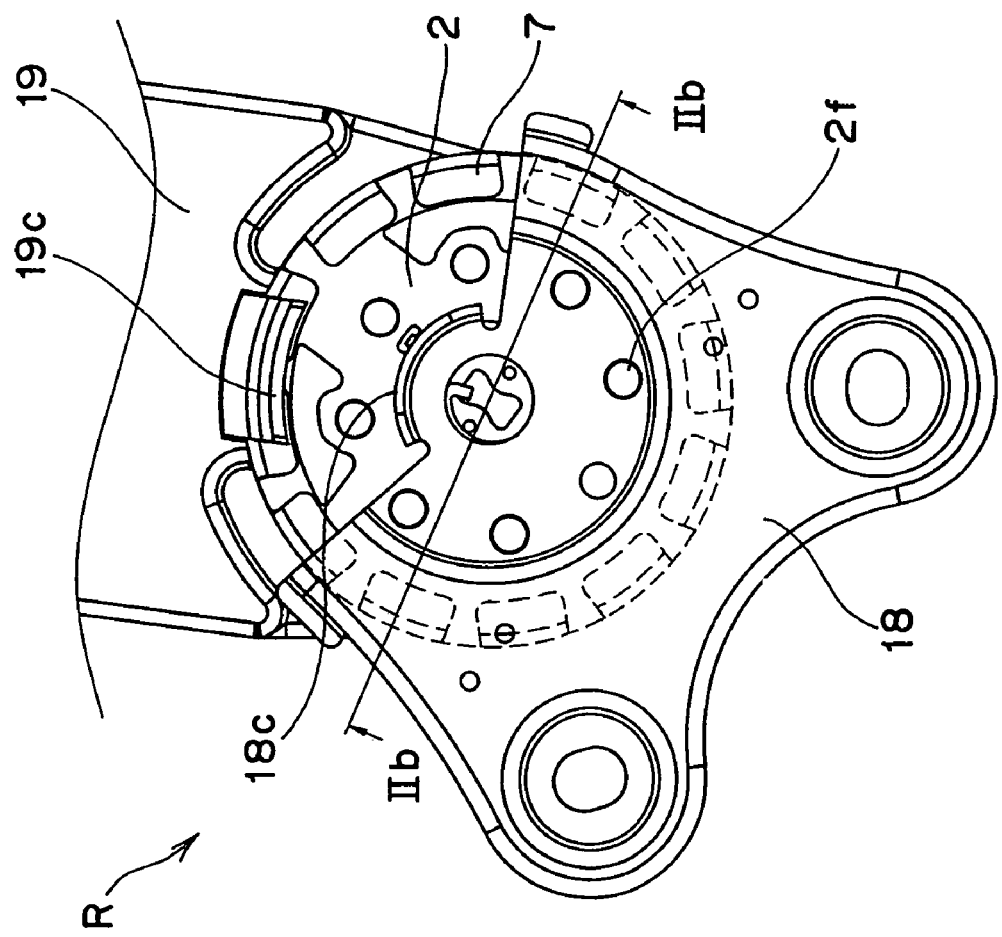

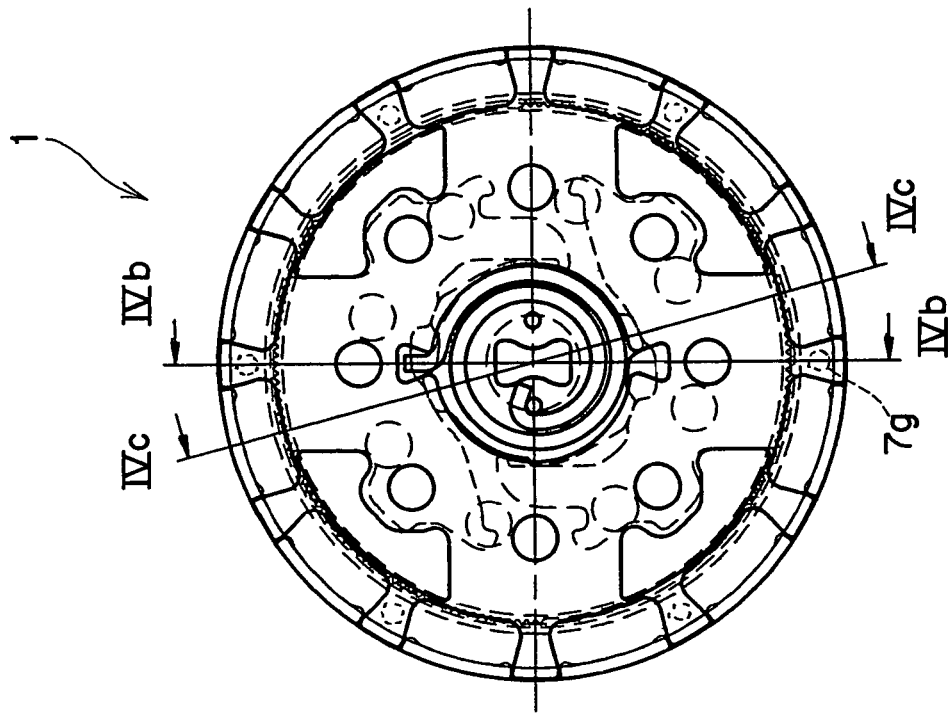

RECLINER ADJUSTER HAVING MAIN AND AUXILIARY LOCK GEARS

BACKGROUND OF THE INVENTION

1. Field of the Invention

The present invention relates to a recliner adjuster attached to, for example, an automobile seat for appropriately adjusting inclination of a seat back with respect to a seat cushion.

2. Description of the Related Art

A recliner adjuster is interposed between a seat cushion and a seat back that can be inclined relative to the seat cushion. A conventional recliner adjuster generally includes a guide bracket fixed to one of the seat cushion and the seat back and an internal gear fixed to the other of the seat cushion and the seat back so as to be rotatable relative to the guide bracket.

This recliner adjuster also includes a cam interposed between the guide bracket and the internal gear and coupled to a support shaft, which is concentric with a center of rotation of the internal gear relative to the guide bracket, for rotation together therewith. The cam is intended to radially slide, upon rotation of the support shaft, a lock gear interposed between the guide bracket and the internal gear and having engaging teeth formed at a distal end surface thereof. The guide bracket has a radially extending guide groove defined therein and having parallel side walls opposed to each other so that rotation of the cam may cause the lock gear to slide along the guide groove so that the engaging teeth are caused to protrude from the guide groove or withdraw inside the guide groove.

On the other hand, the internal gear has internal teeth formed along a circular arc locus having a center that is aligned with the center of rotation thereof. Rotation of the cam causes the lock gear to protrude outwardly from the guide groove to bring the engaging teeth into engagement with the internal teeth, thereby preventing rotation of the internal gear relative to the guide bracket, while reverse rotation of the cam releases the engagement between the engaging teeth and the internal teeth, thereby allowing rotation of the internal gear relative to the guide bracket.

Accordingly, by operating an operation lever to rotate the support shaft, the engaging teeth can be brought into engagement with the internal teeth to lock the seat back, while the engagement of the engaging teeth with the internal teeth can be released to change the inclination of the seat back (see, for example, Document 1).

Another recliner adjuster has been proposed having a plurality of lock gears disposed at regular intervals and a plurality of auxiliary lock gears each disposed between adjacent lock gears, wherein the lock gears slide radially upon rotation of a cam. In this recliner adjuster, if a large load is applied to the seat back due to, for example, a vehicle collision, engaging teeth of the auxiliary lock gears are brought into engagement with the internal teeth, thereby withstanding the large load (see, for example, Document 2).

Document 1: Japanese Laid-Open Patent Publication No. 2000-342370

Document 2: Japanese Laid-Open Patent Publication No. 2000-245561

In the recliner adjuster as disclosed in Document 1, if a large load applied to the seat back presses the lock gear against a side wall of the guide groove to thereby cause deformation of the side wall, the lock gear inclines and the engagement between the engaging teeth of the lock gear and the internal teeth comes loose, resulting in a reduction in the locking strength. In the case of this recliner adjuster, two lock gears are provided to ensure a sufficient locking strength when the recliner adjuster is mounted in an ordinary seat in which a large load applied to the seat back due to, for example, a vehicle collision is transmitted to a vehicle body through a seat belt. However, in the case of a belt-in-seat (seat in which a shoulder belt is incorporated) in which a large load is all applied to the recliner adjuster through the seat back, the use of a very large recliner adjuster is indispensable to withstand the large load.

On the other hand, in the recliner adjuster as disclosed in Document 2, when a large load inputted thereto exceeds a critical torque of the lock gears, the auxiliary lock gears are brought into engagement with the internal teeth so that both the lock gears and the auxiliary lock gears can withstand the large load. It is, however, not easy to stabilize the setting of the critical torque and, hence, there is still room for improvement.

SUMMARY OF THE INVENTION

The present invention has been developed to overcome the above-described disadvantages.

It is accordingly an objective of the present invention to provide a recliner adjuster having a considerably increased locking strength that is applicable to a belt-in-seat without increasing the size thereof.

In accomplishing the above and other objectives, the recliner adjuster according to the present invention includes a guide bracket to be secured to one of the seat cushion and the seat back, an internal gear to be secured to the other of the seat cushion and the seat back, a cam rotatably mounted between the guide bracket and the internal gear, a pair of lock gears interposed between the guide bracket and the internal gear so as to be radially slidable in association with rotation of the cam, and a pair of auxiliary lock gears interposed between the guide bracket and the internal gear so as to be radially slidable in association with the pair of lock gears. The rotation of the cam causes the pair of lock gears to radially slide between respective first engaging positions, at which engaging teeth thereof are held in engagement with internal teeth of the internal gear, and respective first engagement released positions at which the engagement of the engaging teeth of the pair of lock gears with the internal teeth of the internal gear is released. A radial sliding movement of the pair of lock gears between the first engaging positions and the first engagement released positions causes the pair of auxiliary lock gears to radially slide between respective second engaging positions, at which engaging teeth thereof are held in engagement with the internal teeth of the internal gear, and respective second engagement released positions at which the engagement of the engaging teeth of the pair of auxiliary lock gears with the internal teeth of the internal gear is released.

Conveniently, the pair of lock gears slide in a direction perpendicular to a direction in which the pair of auxiliary lock gears slide.

Advantageously, each of the pair of lock gears has a pair of auxiliary lock gear-operating portions that act to radially slide the pair of auxiliary lock gears.

According to the present invention, because the rotation of the cam causes the pair of lock gears to radially slide between respective first engaging positions and respective first engagement released positions, while a radial sliding movement of the pair of lock gears causes the pair of auxiliary lock gears to radially slide between respective second engaging positions and respective second engagement released positions, the locking strength of the recliner adjuster can be considerably increased without increasing the size thereof, by merely adding the pair of auxiliary lock gears to a conventional construction having only the pair of lock gears. This recliner adjuster is applicable to a belt-in-seat having a possibility that a large load may be applied to a seat back.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein:

FIG. 2A is a front view of the recliner adjuster of FIG. 1;

FIG. 2B is a sectional view taken along line IIb-IIb in FIG. 2A;

FIG. 4A is a front view of the recliner assembly of FIG. 3;

FIG. 4B is a sectional view taken along line IVb-IVb in FIG. 4A;

FIG. 4C is a sectional view taken along line IVc-IVc in FIG. 4A;

DETAILED DESCRIPTION OF THE PREFERRED EMBODIMENT

This application is based on an application No. 2004-195751 filed Jul. 1, 2004 in Japan, the content of which is herein expressly incorporated by reference in its entirety.

Figure 1:
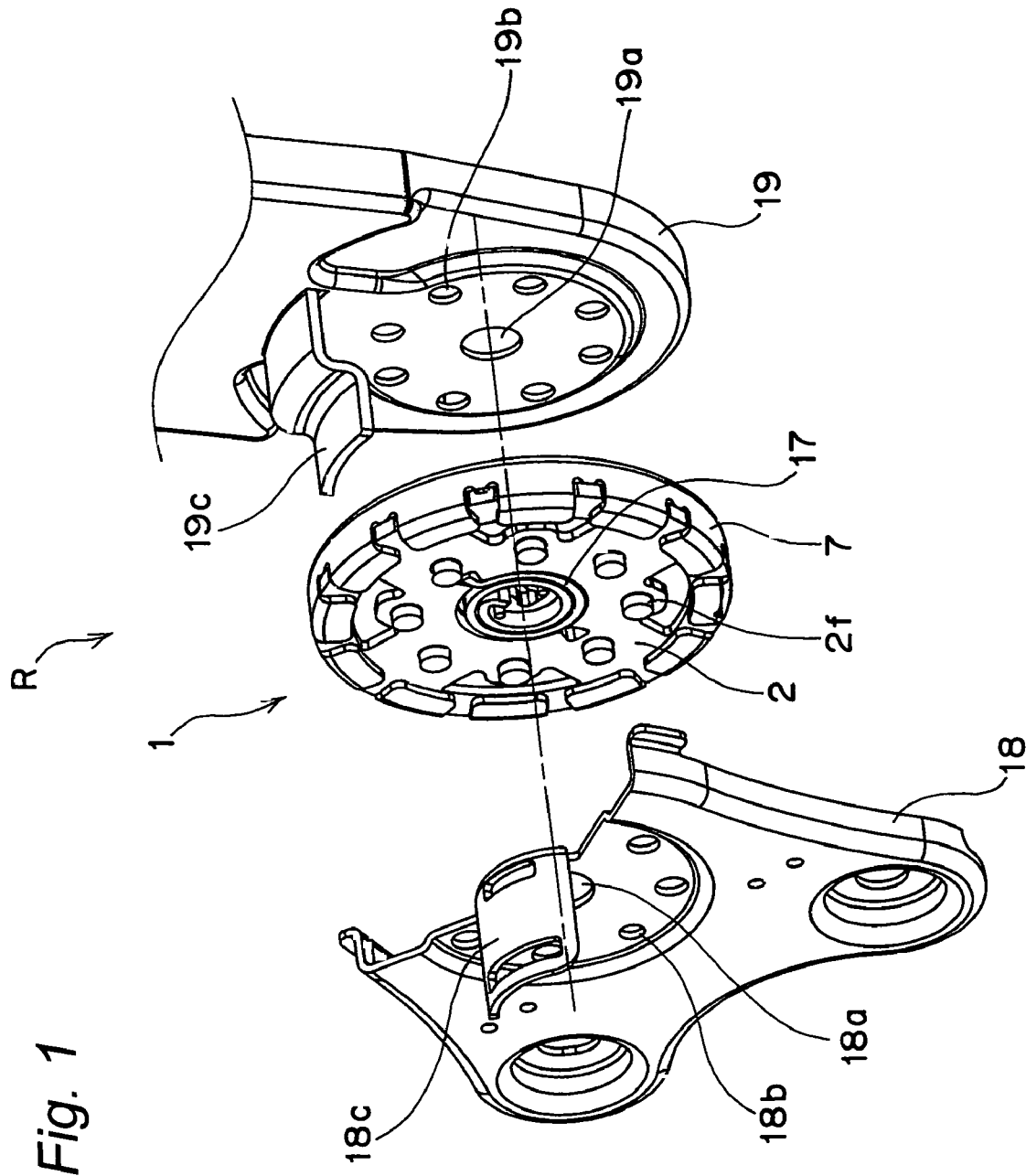
FIG. 1 is an exploded perspective view of a recliner adjuster according to the present invention.
Figure 3:
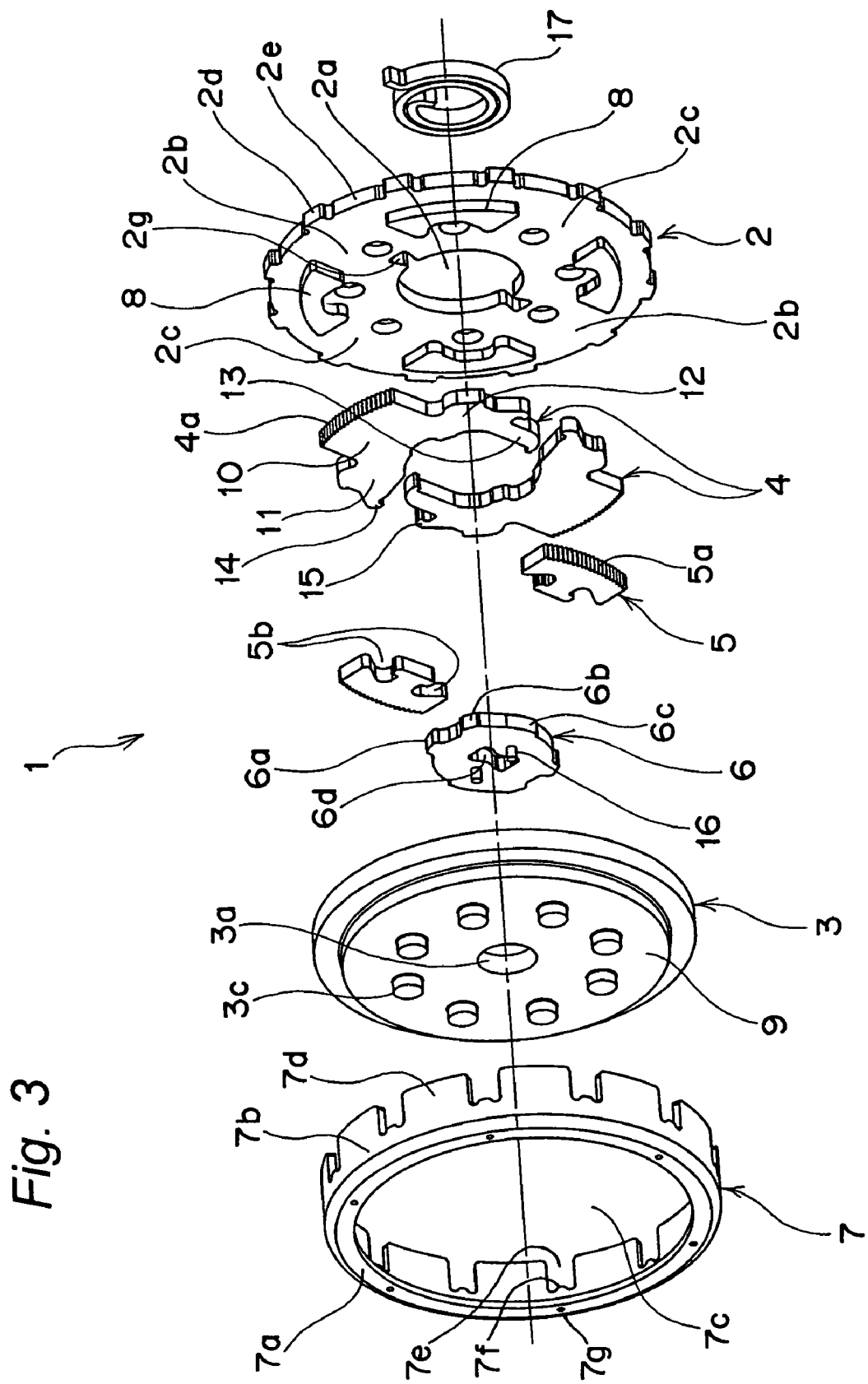
FIG. 3 is an exploded perspective view of a recliner assembly mounted in the recliner adjuster of FIG. 1.

FIG. 1 and FIGS. 2A and 2B depict a recliner adjuster R according to the present invention, which is to be mounted on respective sides of, for example, an automobile seat. The recliner adjuster R is intended to change inclination of a seat back (not shown) relative to a seat cushion (not shown).

The recliner adjuster R includes a generally round recliner assembly 1 mounted on a connecting portion between the seat cushion and the seat back. As shown in FIG. 3, FIGS. 4A-4C and FIGS. 5A and 5B, the recliner assembly 1 includes a guide bracket 2 to be secured to the seat cushion, an internal gear 3 to be secured to the seat back so as to confront the guide bracket 2, a pair of lock gears 4 interposed between the guide bracket 2 and the internal gear 3, a pair of auxiliary lock gears 5 interposed between the guide bracket 2 and the internal gear 3, and a cam 6 operable to move the pair of lock gears 4 towards and away from internal teeth of the internal gear 3. The guide bracket 2 and the internal gear 3 are assembled together by a mounting ring 7 with the lock gears 4, the auxiliary lock gears 5 and the cam 6 accommodated therein. The cam 6 is coupled to an operation lever (not shown), and upon operation of the operation lever, the cam 6 is rotated to radially slide the lock gears 4, followed by a radial sliding movement of the auxiliary lock gears 5.

The guide bracket 2 is formed into a generally round plate and has a central hole (operation lever insertion hole) 2a defined therein in which a portion of the operation lever is received for connection with the cam 6. The guide bracket 2 also has a pair of (front and rear) upper guide members 8 and a pair of (front and rear) lower guide members 8 formed therewith on an inner surface thereof (left side surface in FIG. 3, i.e., surface confronting the internal gear 3) so as to protrude inwardly in the widthwise direction of the recliner assembly 1. The guide members 8 are shaped in a point symmetric fashion with respect to the operation lever insertion hole 2a. The pair of upper guide members 8 have respective side walls extending parallel to each other that confront an associated one of the lock gears 4 and define a first guide groove 2b therebetween in which a portion (engaging portion) of the associated one of the lock gears 4 is slidably received. The same is true of the pair of lower guide members 8. Similarly, the upper and lower guide members 8 confronting each other have respective side walls extending parallel to each other that confront an associated one of the auxiliary lock gears 5 and define a second guide groove 2c therebetween in which one of the auxiliary lock gears 5 is slidably received. The first guide grooves 2b extend in a direction orthogonal to a direction in which the second guide grooves 2c extend. The guide bracket 2 further has a plurality of equally spaced protrusions 2d formed therewith at an outer edge thereof with a plurality of recesses 2e defined therebetween for engagement with the mounting ring 7. The diameter of the plurality of recesses 2e is set to be substantially equal to the outer diameter of the internal gear 3 (accordingly, the recesses 2e are substantially aligned or flush with the outer peripheral surface of the internal gear 3). As best shown in FIG. 1, the guide bracket 2 also has a plurality of equally spaced mounting pins (pin-shaped protrusions) 2f formed therewith around the operation lever insertion hole 2a so as to protrude outwardly in the widthwise direction thereof. The plurality of mounting pins 2f are to engage with a mounting bracket (explained later) that is secured to the seat cushion. The guide members 8 and the mounting pins 2f are unitarily formed with the guide bracket 2 by pressing predetermined portions of the guide bracket 2.

The internal gear 3 has a generally round shape and also has a round protrusion 9 formed therewith at an outer surface thereof (left side surface in FIG. 3) so as to protrude outwardly in the widthwise direction thereof. The round protrusion 9 has a central hole 3a defined therein so as to confront the operation lever insertion hole 2a in the guide bracket 2, and also has a plurality of equally spaced mounting pins (pin-shaped protrusions) 3c formed therewith around the central hole 3a so as to protrude outwardly in the widthwise direction thereof. The plurality of mounting pins 3c are to engage with a mounting bracket (explained later) that is secured to the seat back. Similar to the mounting pins 2f, the mounting pins 3c are unitarily formed with the internal gear 3 by pressing predetermined portions of the internal gear 3. The round protrusion 9 further has a recess 3b (see FIG. 2B) defined on a side thereof confronting the guide bracket 2. The radius of the recess 3b is set to be slightly greater than the radius of curvature of outer peripheral surfaces of the upper and lower guide members 8. As best shown in FIG. 5B, the recess 3b has a round side wall having internal teeth 3d formed on the whole surface thereof. When the guide bracket 2 and the internal gear 3 are assembled together, the guide members 8 are accommodated within the recess 3b so that the outer peripheral surfaces of the guide members 8 may be held in sliding contact with the side wall of the recess 3b.

Each lock gear 4 includes an engaging portion 10 slidably received in one of the first guide grooves 2b in the guide bracket 2, first and second shoulder portions 11, 12 unitarily formed with the engaging portion 10 on respective sides thereof, a leg portion 13 extending from the second shoulder portion 12 towards the first shoulder portion 11 of the opposite lock gear 4, a first auxiliary lock gear-operating portion 14 extending from the first shoulder portion 11 towards one of the auxiliary lock gears 5, and a second auxiliary lock gear-operating portion 15 extending from the second shoulder portion 12 towards the other of the auxiliary lock gears 5. The engaging portion 10 has engaging teeth 4a formed at a distal end thereof so as to be engageable with the internal teeth 3d of the internal gear 3. Under the condition in which the guide members 8 are accommodated within the recess 3b in the internal gear 3, rotation of the internal gear 3 relative to the guide bracket 2 is prevented by engagement between the engaging teeth 4a and the internal teeth 3d. Each lock gear 4 also includes a protrusion 13a formed with the leg portion 13 at an inner edge of a distal portion thereof. The protrusion 13a acts such that when a portion of the cam 6 engages with the protrusion 13a upon rotation of the cam 6, the lock gear 4 is caused to slide radially inwardly.

The length of the leg portion 13 is determined such that each lock gear 4 slidably received within the recess 3b in the internal gear 3 can move between an engaging position, at which the engaging teeth 4a formed at the engaging portion 10 are held in engagement with the internal teeth 3d of the internal gear 3 upon a radially outward movement of the lock gear 4, and an engagement released position at which the engagement of the engaging teeth 4a with the internal teeth 3d is released upon a radially inward movement of the lock gear 4. More specifically, the distance between the engaging position and the engagement released position is slightly greater than the depth of the engaging teeth 4a, and when the lock gear 4 moves radially outwardly from the operation lever insertion hole 2a, the engaging teeth 4a are brought into engagement with the internal teeth 3d, while when the lock gear 4 moves radially inwardly towards the operation lever insertion hole 2a, the engagement of the engaging teeth 4a with the internal teeth 3d is released.

Each auxiliary lock gear 5 has engaging teeth 5a formed at a distal end thereof so as to be engageable with the internal teeth 3d of the internal gear 3, and also has two recesses 5b defined therein in which the first auxiliary lock gear-operating portion 14 of one of the lock gears 4 and the second auxiliary lock gear-operating portion 15 of the other of the lock gears 4 are slidably received. The first and second auxiliary lock gear-operating portions 14, 15 of the lock gears 4 and the two recesses 5b in the auxiliary lock gears 5 are so shaped that when the lock gears 4 slide radially outwardly or inwardly, the auxiliary lock gears 5 similarly slide radially outwardly or inwardly.

The cam 6 is almost hexagonal and has three protrusions 6a, 6b, 6c confronting one of the lock gears 4 and three protrusions 6a, 6b, 6c confronting the other of the lock gears 4. The first protrusion 6a is engageable with an inner inclined surface 11a of the first shoulder portion 11 of the lock gear 4, the second protrusion 6b is engageable with a protrusion 12a formed at an inner edge of the second shoulder portion 12 of the lock gear 4, and the third protrusion 6c is engageable with the protrusion 13a of the leg portion 13 of the lock gear 4.

The cam 6 has an elongated hole 6d defined therein at a central portion thereof in which an operation lever is received for operation of the cam 6. The cam 6 also has two pins 16 secured thereto on respective sides of the elongated hole 6d. One end of a spiral spring 17 is connected to one of the two pins 16, and the other end of the spiral spring 17 is received in a notch 2g formed at an inner edge of the guide bracket 2, thereby causing the cam 6 to press the lock gears 4 radially outwardly.

The mounting ring 7 has a generally flat annular portion 7a and a cylindrical side portion 7b extending from an outer edge of the annular portion 7a in a direction perpendicular thereto. The annular portion 7a has a round hole 7c defined therein and having a diameter slightly greater than the outer diameter of the round protrusion 9 of the internal gear 3, while the cylindrical side portion 7b has a plurality of mounting pieces 7d formed therewith at intervals equal to those of the plurality of recesses 2e formed in the guide bracket 2 at an outer edge thereof. The mounting pieces 7d have a width slightly less than that of the recesses 2e. The inner diameter of the cylindrical side portion 7b is set to be substantially the same as (to be precise, slightly greater than) the diameter of the recesses 2e and the outer diameter of the internal gear 3.

In assembling the recliner assembly 1, the guide bracket 2 and the internal gear 3 are first mated together with the lock gears 4, the auxiliary lock gears 5, and the cam 6 interposed therebetween, and the mounting ring 7 is subsequently attached to the internal gear 3 so that each of the mounting pieces 7d may be inserted into one of the recesses 2e in the guide bracket 2, and the round protrusion 9 of the internal gear 3 may be inserted into the round hole 7c in the mounting ring 7. By so doing, a plurality of protrusions 7f formed at bottom portions of slits 7e between the mounting pieces 7d of the mounting ring 7 are brought into contact with inner surfaces of the protrusions 2d of the guide bracket 2. Under such condition, the assemblage of the recliner assembly 1 is completed by bending distal ends of the mounting pieces 7d inwardly by about 90 degrees.

As best shown in FIG. 4C, the guide bracket 2 and the internal gear 3 are sandwiched between the generally flat annular portion 7a and the bent portions of the mounting pieces 7d of the mounting ring 7, and the outer peripheral surface of the internal gear 3 is held in sliding contact with the inner surface of the cylindrical side portion 7b of the mounting ring 7, while an outer surface of the internal gear 3 located radially outwardly of the round protrusion 9 is held in sliding contact with an inner surface of the generally flat annular portion 7a of the mounting ring 7. Accordingly, looseness of the internal gear 3 in both the radial and widthwise directions is restrained by the mounting ring 7. That is, the positioning of the internal gear 3 in both the radial and widthwise directions is accomplished by the mounting ring 7. The mounting ring 7 has a plurality of (for example, six) protrusions 7g formed on the inner surface of the generally flat annular portion 7a at regular intervals, and the sliding contact between the outer surface of the internal gear 3 and the inner surface of the generally flat annular portion 7a of the mounting ring 7 is carried out by way of those protrusions 7g, thus ensuring a minimum clearance between the outer surface of the internal gear 3 and the inner surface of the generally flat annular portion 7a of the mounting ring 7 for smooth operation of the internal gear 3.

As shown in FIG. 1, a mounting bracket 18 that is to be secured to the seat cushion has an operation lever insertion hole 18a formed at a central portion thereof and a plurality of pin insertion holes 18b formed around the operation lever insertion hole 18a at regular intervals for insertion of the mounting pins 2f of the guide bracket 2 thereinto. A mounting bracket 19 that is to be secured to the seat back similarly has a connecting shaft insertion hole 19a formed at a central portion thereof and a plurality of pin insertion holes 19b formed around the connecting shaft insertion hole 19a at regular intervals for insertion of the mounting pins 3c of the internal gear 3 thereinto.

Upon completion of the assemblage of the recliner assembly 1, the mounting pins 2f of the guide bracket 2 are inserted into the pin insertion holes 18b in the mounting bracket 18 secured to the seat cushion, and the mounting pins 2f are welded to the mounting bracket 18, while the mounting pins 3c of the internal gear 3 are inserted into the pin insertion holes 19b in the mounting bracket 19 secured to the seat back, and the mounting pins 3c are welded to the mounting bracket 19, thereby holding the recliner assembly 1 between the two mounting brackets 18, 19. As shown in FIG. 2B, the mounting bracket 18 is so shaped that a surface thereof (surface confronting the recliner assembly 1) is held in contact with the outer surfaces of the bent portions of the mounting pieces 7d in order to sandwich the bent portions between the guide bracket 2 and the mounting bracket 18. By so doing, when a load is applied to the recliner assembly 1, opening or spacing of the bent portions is prevented.

The two mounting brackets 18, 19 have respective outwardly bent latches 18c, 19c unitarily formed therewith, and a spiral spring (not shown) is connected at one end thereof to the latch 18c and at the other end thereof to the latch 19c to always bias the seat back forward.

One end of a connecting shaft (not shown) is inserted into the connecting shaft insertion hole 19a in the mounting bracket 19 secured to the seat back and is connected to an operation lever, while the other end of the connecting shaft is connected to the cam of the recliner adjuster located on the opposite side of the seat so that the two opposite recliner adjusters may be synchronously operated by operating the operation lever.

The operation of the recliner adjuster R according to the present invention is explained hereinafter with reference to FIGS. 5A and 5B.

Figure 5A:
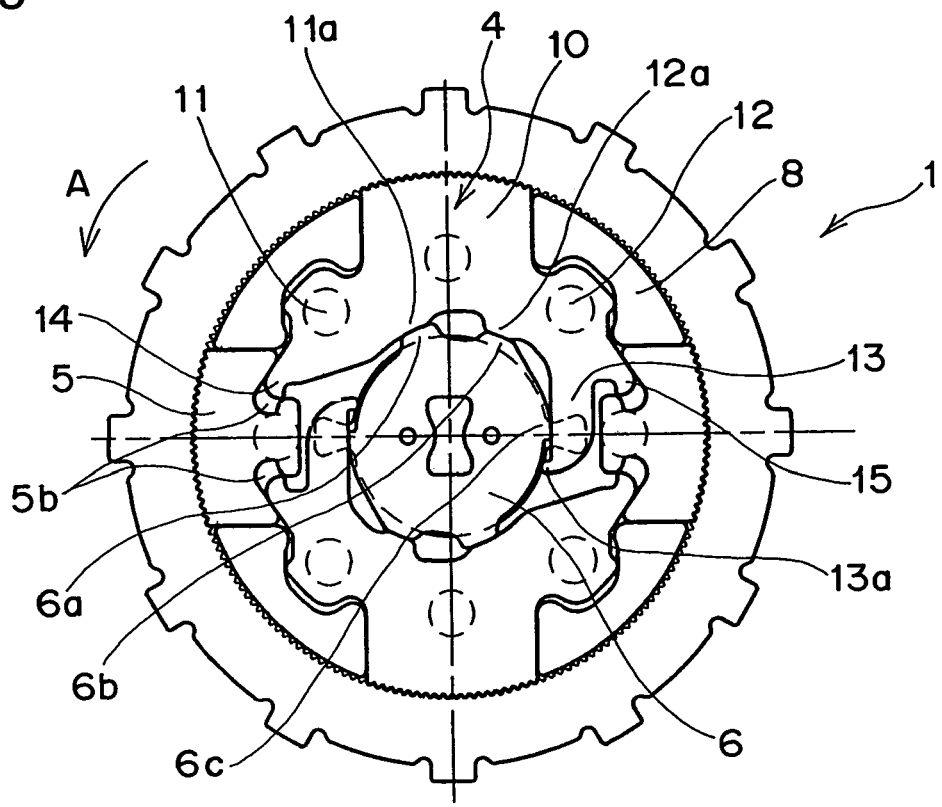
FIG. 5A is a front view of the recliner assembly of FIG. 3, particularly depicting a condition in which lock gears and auxiliary lock gears are held in engagement with an internal gear.
Figure 5B:
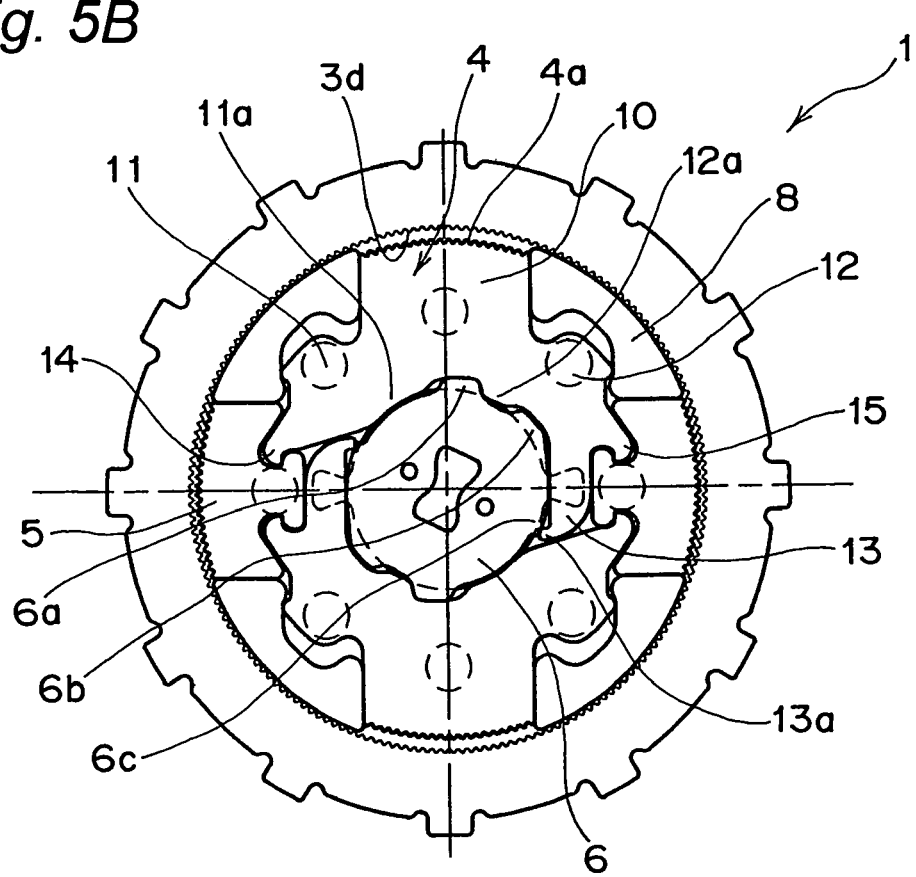
FIG. 5B is a view similar to FIG. 5A, but depicting a condition in which the engagements between the lock gears and the internal gear and between the auxiliary lock gears and the internal gear are released.

As shown in FIG. 5A, under the normal condition in which the operation lever is not operated, the cam 6 is biased in a direction of an arrow A by means of an elastic force of the spiral spring 17.

In this condition, the first and second protrusions 6a, 6b of the cam 6 are respectively held in contact with the inner inclined surface 11a of the first shoulder portion 11 of the lock gear 4 and with the protrusion 12a of the second shoulder portion 12 of the lock gear 4 to press the lock gear 4 radially outwardly, thereby causing the engaging teeth 4a of the lock gear 4 to engage with the internal teeth 3d of the internal gear 3. When the lock gear 4 is in the engaging position, outer edges of the first and second auxiliary lock gear-operating portions 14, 15 press side walls of the recesses 5b in the auxiliary lock gears 5 radially outwardly, thereby causing the engaging teeth 5a of the auxiliary lock gears 5 to engage with the internal teeth 3d of the internal gear 3. Accordingly, the position of the internal gear 3 relative to the guide bracket 2 or the inclination of the seat back relative to the seat cushion is maintained at a predetermined position or a predetermined angle.

In this condition, when the operation lever is lifted against the elastic force of the spiral spring 17, the cam 6 is rotated in a direction counter to the direction of the arrow A, and the first protrusion 6a of the cam 6 is introduced into a recess defined between the inner inclined surface 11a and the protrusion 12a of the lock gear 4, while the second protrusion 6b of the cam 6 is introduced into a recess defined on the inner side of the second shoulder portion 12 of the lock gear 4. Furthermore, the third protrusion 6c of the cam 6 is brought into contact with and press the protrusion 13a of the leg portion 13 of the lock gear 4 to thereby slide the engaging portion 10 of the lock gear 4 radially inwardly along the first guide groove 2b. As a result, the engagement between the engaging teeth 4a and the internal teeth 3d of the internal gear 3 is released, and the lock gear 4 moves from the engaging position shown in FIG. 5A to the engagement released position shown in FIG. 5B. During such movement of the lock gear 4, inner edges of the first and second auxiliary lock gear-operating portions 14, 15 press the side walls of the recesses 5b in the auxiliary lock gears 5 radially inwardly, thereby releasing the engagement between the engaging teeth 5a of the auxiliary lock gears 5 and the internal teeth 3d of the internal gear 3. Accordingly, the posture (inclination) of the seat back relative to the seat cushion can be changed.

After the posture of the seat back relative to the seat cushion has been set to a desired one, when the operation lever is released, the cam 6 is rotated in the direction of the arrow A by means of the elastic force of the spiral spring 17 to thereby slide the lock gear 4 and the auxiliary lock gears 5 radially outwardly. As a result, the engaging teeth 4a, 5a engage with the internal teeth 3d of the internal gear 3 again, thereby holding the seat back in the newly set posture.

It is to be noted here that although in the above-described embodiment the guide bracket 2 and the internal gear 3 have been described as being respectively secured to the seat cushion and the seat back, such a construction that the guide bracket 2 and the internal gear 3 are respectively secured to the seat back and the seat cushion is also possible.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recliner adjuster for adjusting an inclination of a seat back with respect to a seat cushion, comprising:
 a guide bracket to be secured to one of the seat cushion and the seat back;
 an internal gear to be secured to the other of the seat cushion and the seat back, the internal gear having internal teeth;
 a cam rotatably mounted between the guide bracket and the internal gear;
 a pair of lock gears interposed between the guide bracket and the internal gear so as to be radially slidable in association with rotation of the cam, each of the pair of lock gears having engaging teeth; and
 a pair of auxiliary lock gears interposed between the guide bracket and the internal gear so as to be radially slidable in association with the pair of lock gears, each of the pair of auxiliary lock gears having engaging teeth;
 wherein the rotation of the cam causes the pair of lock gears to radially slide between respective first engaging positions, at which the engaging teeth thereof are held in engagement with the internal teeth of the internal gear, and respective first engagement released positions at which the engagement of the engaging teeth of the pair of lock gears with the internal teeth of the internal gear is released, and wherein a radial sliding movement of the pair of lock gears between the first engaging positions and the first engagement released positions causes the pair of auxiliary lock gears to radially slide between respective second engaging positions, at which the engaging teeth thereof are held in engagement with the internal teeth of the internal gear, and respective second engagement released positions at which the engagement of the engaging teeth of the pair of auxiliary lock gears with the internal teeth of the internal gear is released.

2. The recliner adjuster according to claim 1, wherein the pair of lock gears slide in a direction perpendicular to a direction in which the pair of auxiliary lock gears slide.

3. The recliner adjuster according to claim 1, wherein each of the pair of lock gears has a pair of auxiliary lock gear-operating portions that act to radially slide the pair of auxiliary lock gears.

4. The recliner adjuster according to claim 2, wherein each of the pair of lock gears has a pair of auxiliary lock gear-operating portions that act to radially slide the pair of auxiliary lock gears.

* * * * *